United States Patent Office 3,113,373
Patented Dec. 10, 1963

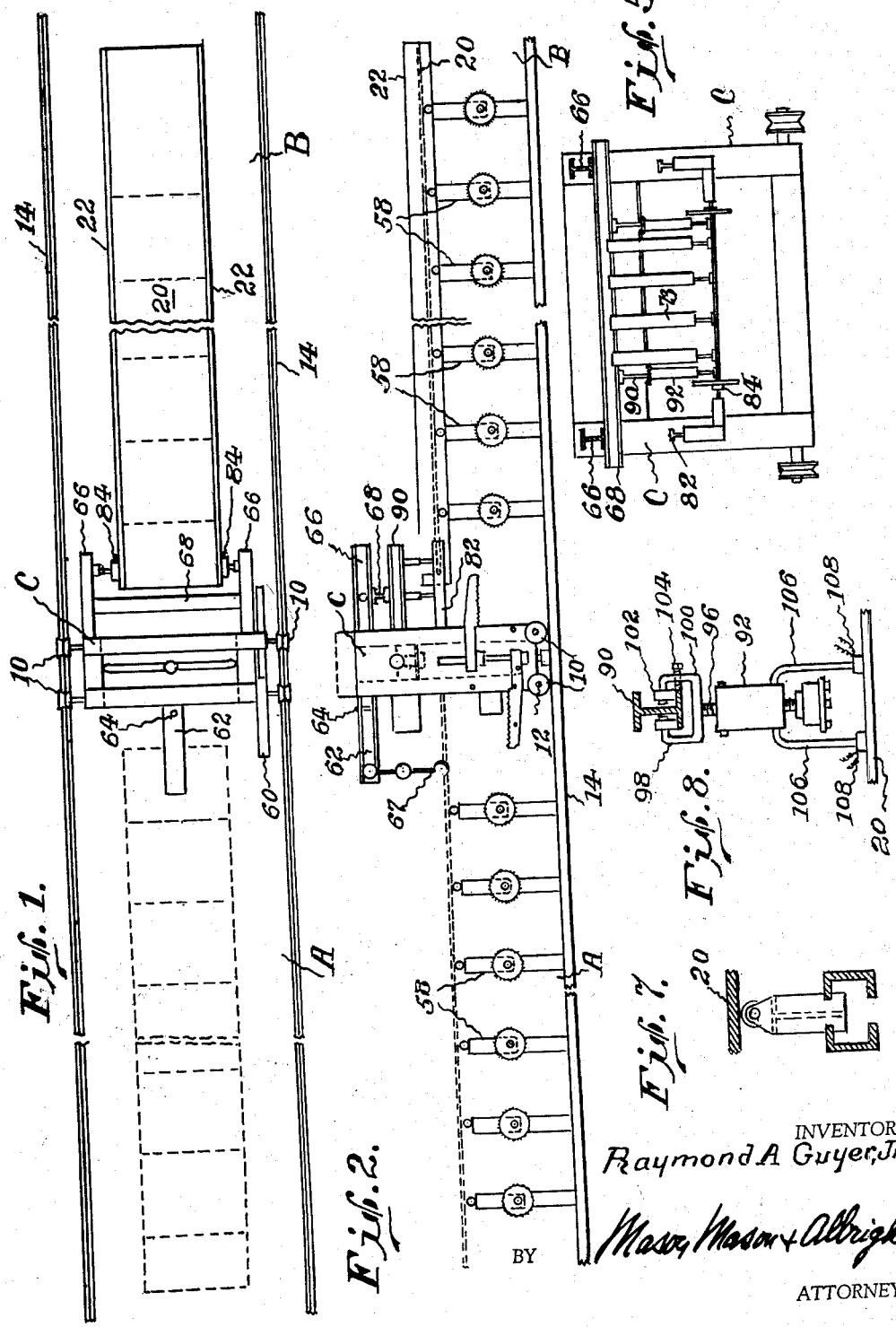

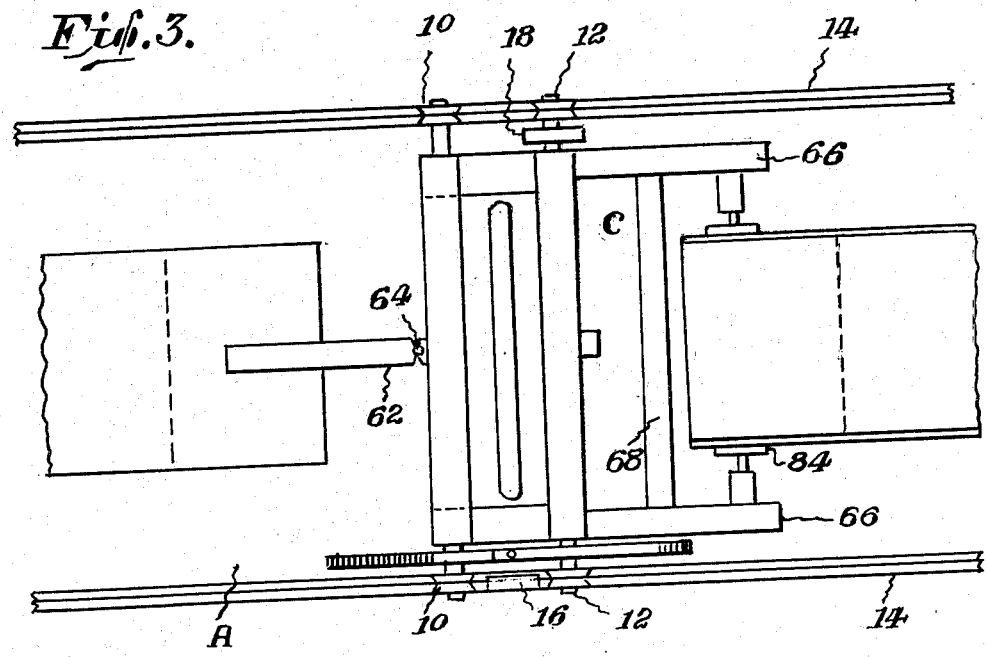
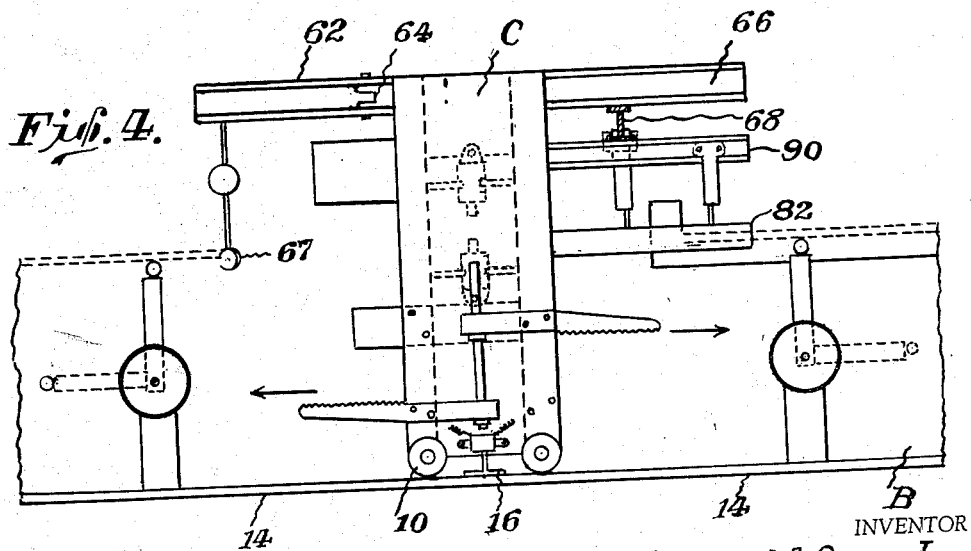

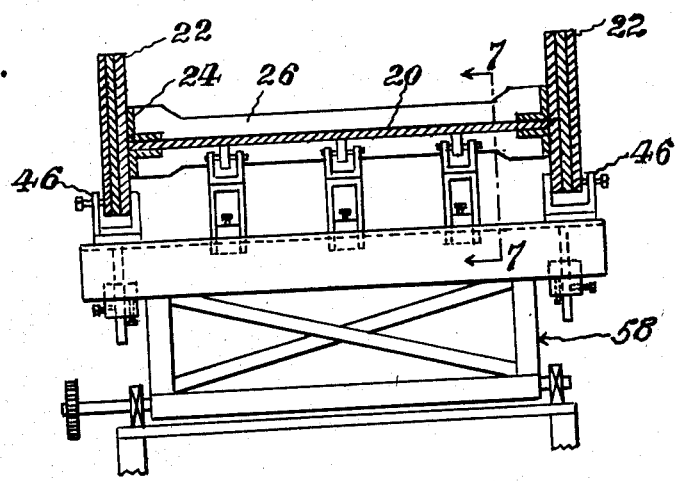
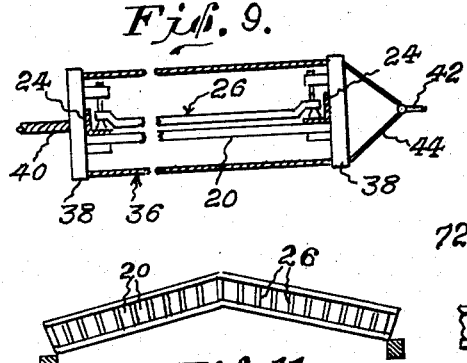
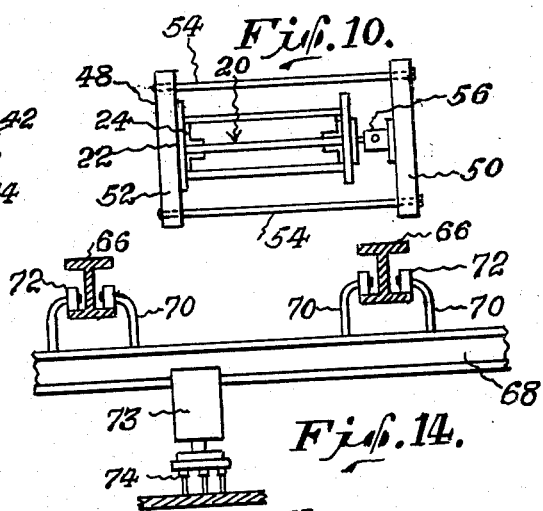
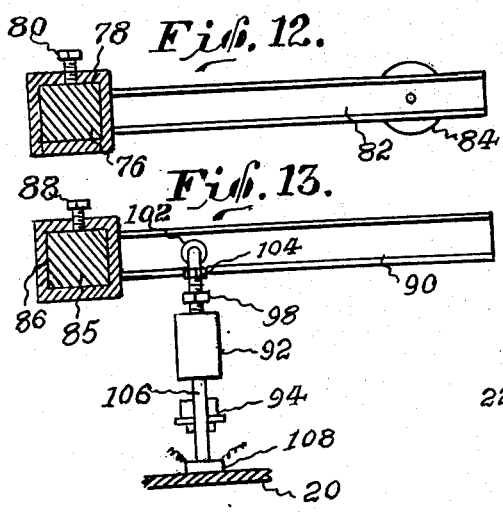
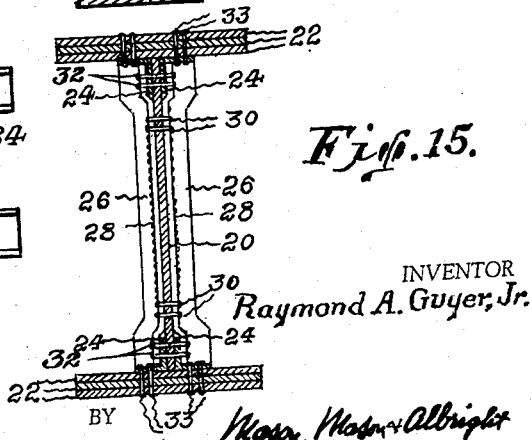

3,113,373
METHOD FOR MANUFACTURE OF RIVETED PLATE GIRDERS
Raymond A. Guyer, Jr., Paoli, Pa., assignor to Lukens Steel Company, Coatesville, Pa., a corporation of Pennsylvania
Original application Aug. 8, 1958, Ser. No. 754,024, now Patent No. 3,052,140, dated Sept. 4, 1962. Divided and this application Dec. 21, 1961, Ser. No. 161,113
9 Claims. (Cl. 29—155)

This invention pertains to the fabricating of riveted plate girders, which includes initially attaching by tack welding or with suitable clamping means the various parts in place. A movable gantry is then moved along the work and the various operations of drilling and riveting are performed on the assembled work pieces.

The invention described and claimed herein is a division of my application Serial No. 754,024, filed August 8, 1958 now U.S. Patent No. 3,052,140.

An object of the invention is to provide a method of using a substantially stationary workpiece and a movable gantry for performing the several operations on the workpiece.

An additional object is to provide a method of using a means for drilling in situ from various directions to provide holes for rivets which attach the flange angles to the cover plate and web plate, and to fabricate the cover plate if it consists of one or more layers of metal, by multiple drilling operations.

Another object is to provide a method of using a gantry mechanism means for adjusting the gantry for the fabrication of girders of different widths, and additional means for adjusting to cover plates of different widths, whereby to provide a mechanism to perform drilling operations both vertically as well as horizontally, provision being made for adjustments of the gantry parts and the drills supported thereby in the making of different sized and different proportioned girders.

A further object is to provide a novel method for quickly adjusting the several riveting heads to proper position for different sized girders.

Other objects will appear hereinafter throughout the specification.

In the drawings:
FIGURE 1 is a top plan diagrammatic view of the apparatus of this invention, omitting the supporting tables;
FIGURE 2 is a side elevation of the structure shown in FIGURE 1 with the supporting tables shown in place, with the cover plate drill omitted for purposes of clarity;
FIGURE 3 is an enlarged top plan view of the gantry shown in FIGURES 1 and 2;
FIGURE 4 is an enlarged side elevational view of the structure shown in FIGURES 1 and 2;
FIGURE 5 is a front elevational view of the gantry showing drills supported thereon;
FIGURE 6 is a front elevational view, partly in section and partly broken away, of the beam or girder and one of the supporting tables therefor;
FIGURE 7 is a detailed sectional view taken on the line 7—7 of FIGURE 6;
FIGURE 8 is a detailed view, partly in section, of one of the multiple drills and the supporting means therefor;
FIGURE 9 is a vertical sectional view, partly in full lines, of the means for turning the girder on its axis;

FIGURE 10 is a front elevational view of the cover plate clamps;
FIGURE 11 is an exaggerated side elevational view showing the camber of the girder;
FIGURE 12 is a view, partly in perspective, of one of of the supporting bars showing a beam extending therefrom, and the multiple cover plate drill supported thereby;
FIGURE 13 is a view similar to FIGURE 12 but showing a flange drill supported by the beam;
FIGURE 14 shows the transversely supporting I-beams for supporting the longitudinal beam, which latter supports the multiple web plate vertical drilling units; and
FIGURE 15 is a vertical sectional view of a completed girder or beam.

General Construction

The invention relates to the manufacture of large, rigid riveted plate girders involving a minimum of handling of the girder component parts, and a minimum of working space. Heretofore plate girders were made by punching holes in the respective parts of the girder, following which the parts were assembled to form the girder and held together by rivets. Prior to riveting, however, it was necessary to ream the holes of the several parts in place in order to assure a solid rigid joint. Such a girder when completed is illustrated in FIGURE 15 herein. It will be seen, as illustrated in FIGURE 15, that the typical girder comprises one or more cover plates at opposite ends thereof, separated by a web plate. These parts are usually held together by rivets which connect flange angles located at the juncture of the web plate with the cover plate, each of which flange angles are riveted to the cover plates and web plate. A typical girder, made in accordance with the process and apparatus of this invention, may be twelve feet deep and one hundred fifty feet long. The web plate in such a girder is made up of a number of pieces of metal totaling approximately one hundred fifty feet in length, the girder having a depth, including the cover plates, of approximately twelve feet. However, the apparatus of this invention is adjustable to compensate for girders of different depths and can be used to fabricate a girder having cover plates that are of different thicknesses and widths.

Suitably spaced on opposite sides of the web plates along the longitudinal length thereof are stiffener members (flange angles) which are substantially the same length as the width of the web plates. These stiffener members are riveted both to the web plates and to the cover plates.

The present invention relates to riveted girders fabricated by initially bringing together or assembling the component girder parts and holding said parts either by tack welding or by clamping means, such as hydraulic clamps, or both, so that the various parts are in proper assembled relationship for the fabrication of a girder in situ. Subsequently, by means of drilling aligned holes, without disturbing the relationship of the parts, the assembly is ready for the riveting operation. The riveting operation directly follows the drilling operation, in order to make one solid rigid plate girder.

It will be noted that one of the advantages of this invention is that plate girders may be fabricated without requiring the respective pieces thereof to be constantly moved from one position to another, in accordance with present practice for the fabrication of plate girders.

The girder component parts are not moved during the several operations except for a 180° rotation of the web plate (with the stiffener angles and flange angles mounted on one side) on its longitudinal axis. In other words the present invention eliminates the steps of moving the web plate, web stiffener angle, cover plates, and flange angle through a stationary punch press and then assembling these parts, and reaming and riveting, as noted above.

In the present invention the work remains stationary except that after one-half the operation is completed, the web plate (with attached stiffener angles and flange angles) is rotated 180° on its longitudinal axis. Consequently considerable space is saved over the conventional method and use of the punch presses which require entrance and takeaway space.

This invention enables the in-place assembly of the various parts and the movement of a gantry means along the tracks which extend longitudinally of the workpiece. The gantry mounts the drilling and riveting mechanisms. As the gantry moves progressively to a series of stations, where it stops to perform riveting or drilling operations, the work supporting means adjacent the gantry is automatically moved out of the way of the gantry so as not to interfere with the movements thereof. After the gantry has passed beyond the work supporting means, said work supporting means will each individually be restored to its original position in load-supporting engagement with the work. The gantry is power driven and is mounted on wheels, which preferably run on tracks longitudinally of the workpiece. Means are provided for holding the gantry against movement during each drilling or riveting operation. A preferable arrangement will include a plurality of stations, one station to be used for assembly and tack welding or clamping the various elements in position for one plate girder, another station to be used for supporting a second plate girder during drilling and riveting operations.

While the parts are being assembled at the first station, drilling and riveting operations are carried on at the second station. When the latter operations are completed the girder is removed from the second station, and the parts of a new girder are assembled at this second station by tack welding and/or clamping the parts in proper position, while the gantry proceeds to the first station for drilling and riveting operations. The work is completed by moving the gantry to separate stations over the girder in order to drill and rivet the parts in final position. The apparatus is used at as many stations as necessary to complete the girder, after which the completed girder is removed and the assembling operation begins over again.

It will be noted that the tracks for the gantry extend so that the same may move over the partially completed girder at either of the stages. Any number of stations may be provided.

Referring now to the drawings, as will be noted in FIGURES 1 and 2, A and B are stations for the assembly and fabrication of separate plate girders, and C is the gantry which moves from station A to station B. Preferably the gantry is provided with a plurality of supporting wheels or rollers 10 mounted on suitable shafts 12.

The wheels are mounted on tracks 14 which extend from one station to the other, in order that the gantry may perform one series of operations at one station to complete the fabrication of a girder and then be moved to another station to complete the fabrication operations at that station. At this time the parts of a second girder are being assembled and either clamped or tack welded or both, so that the parts will be in proper position for drilling and riveting when the gantry moves again to the station where these parts are being assembled and affixed to each other.

It will be understood that each girder will be lifted or otherwise moved from the station after the operation has been completed.

Preferably when moving along the tracks at one of the stations and during the drilling and riveting operations, the gantry is held in a stationary position, such as by a magnetic brake, as illustrated at 16 in FIGURE 4. The gantry is propelled by any suitable means along the tracks, such as by a reversible electric motor 18 shown in FIGURE 3.

Various types of girders may be fabricated by using the instant invention. However, for purposes of illustration, a girder of one specific type has been shown in completed form in FIGURE 15. This girder comprises a web plate 20. The cover plates 22 may comprise a plurality of layers as shown in FIGURES 6 and 15. The means for attaching the web plate to the cover plates comprises four flange angles 24, which are L-shaped in cross section. Stiffener angles which also may be L-shaped, or T-shaped in cross section are shown at 26. It will be noted that the upper and lower ends of each stiffener angle are bent to accommodate the flange angles. The flanges of the stiffener angles which lie against the sides of the web plate are indicated at 28 in FIGURE 15. These stiffener angles are riveted to the web plate by rivets 30, and rivets 32 extend through flanges 28 of stiffener angles 26, a pair of flange angles 24, and the web plate 20. The cover plates 22 are affixed to the flange angles by rivets 33. Each cover plate may consist of one or more layers or plies, and the web plate may also consist of more than one layer or ply (not shown).

The structure shown in FIG. 9 illustrates one of the web turning devices. Each of these may be located between a pair of supports 58. These web plate turn-over members are used, following the assembly and tack welding operation of attaching reenforcing members to the web plate and cover plates, to turn the web plate about a 180° angle on its longitudinal axis so as to permit the tack welding operation to proceed on the opposite side of the web plate whereby to attach the reenforcing members, such as 24 and 26 in proper position for drilling and riveting operations. Each turn-over member 36 comprises a pair of clamping ends 38 having a wire rope 40 connected to one of the ends and a crane hook 42 having a cable 44 connected to the other end 38 of the member 36. These turn-over members 36, should be removed from their positions between the spaced supports, before the cover plates 22 are attached. When the cover plates are attached, they are held in proper position by the clamping screws 46 mounted on the gantry as seen in FIGURE 6.

When the turn-over members are removed clamping frames shown at 48 in FIGURE 10 are applied. There are a plurality of these, and they are positioned to take the place of the turn-over members 36. Each frame is provided with oppositely located backing members 50 and 52, these being held to each other by the tie rods 54. The cover plates are forced toward each other and into engagement with the web plate and stiffener members by a hydraulic clamping member 56. It will be understood that in place of the hydraulic clamping member 56, screw jacks or air cylinders may be used whereby to exert sufficient force to hold the cover plates 22 in correct position on the partially assembled girder.

FIGURE 11 shows a side elevation of a girder indicating a cambered construction. It will be understood that in actual practice the amount of camber will not be as excessive as shown in this figure. The apparatus of this invention is adapted to drill holes and perform riveting operations on girders even though they are cambered.

At the start of the operation, when the parts are assembled at station A, the web plate is placed in a horizontal plane on a plurality of the pivoted supports, with the supports located in a vertical position, as shown in FIGURE 2. The flange angles 24 are then clamped or tack welded in place. The web stiffeners are then tack welded to the upper surface of the web plate and to the oppositely positioned flange angles on this upper surface.

It will be understood that at this time a plurality of the turn-over members shown in FIGURE 9 are affixed to the web plates and upper stiffener members, each of them being located between a pair of tables or supports.

The web plate with the attached flange angles and web stiffeners is then rotated 180° on its longitudinal axis by the turn-over members shown in FIGURE 9. Each plate turn-over member is controlled by a crane operator who uses the wire steering rope for controlling the rotation of a turn-over member about its longitudinal axis. The turn-over members are operated in unison whereby the web plate may be raised and then rotated about a 180° angle on its longitudinal axis. It is then lowered to the position where it again rests upon the supports. In the event the flange angles have only been attached to one side of the web plate, they are now attached to what is at this time the upper surface of the said web plate. The spaced stiffener angles are then placed on this surface and held in position by tack welding and/or clamping members. The web plate will now have attached to its opposite sides the flange angles and web stiffener angles.

The turn-over members may then be removed from the assembly line. The two cover plates are then placed in clamp, as shown in FIGURE 6, and are clamped rigidly in position by the screws 46, which serve to properly position the cover plates inasmuch as they may be adjusted vertically and horizontally to accommodate different sized cover plates and to position the cover plates against web plates of different widths.

Additionally a plurality of cover plate clamps 48, one of which is shown in FIGURE 10, are utilized between pairs of tables or supports after the turn-over members shown in FIGURE 9 have been removed, or prior to such removal.

The cover plates 22 are then placed in the clamps 46 shown in FIGURE 6 that are mounted on the supports and are rigidly held in proper position thereby. At this time, the clamping frame 48 is utilized between the spaced supports as shown in FIGURES 2 and 6, to rigidly position the parts in proper position. As shown in FIGURE 6, the parts are in position for tack welding to each other. After the completion of the tack welding operation, the frames 48 and clamps 46 are removed, in order that the gantry may be moved into position for drilling and riveting operations. The entire weight of the tack welded girder is now supported by the supports 58 as shown in FIGURES 2 and 6.

Gantry Construction

Referring now to the gantry indicated by C in FIGURES 1, 2, 3 and 4, certain parts of which are shown as enlarged in FIGURES 12, 13 and 14, said gantry is shown as having supporting sides for supporting the drilling members as hereinafter described.

The gantry is removed after the drilling and riveting operations are performed along the entire length of the girder. The gantry is then moved on its tracks from station B to station A where fabrication is performed to make a second girder, it being understood that the drilling and riveting apparatus is solely supported on the mobile gantry. It is not contemplated that the tack welding apparatus be supported on the gantry, although such a supporting means could be so used, but the time of construction for completely fabricating a girder could be better spent by performing the tack welding operations and/or clamping operations at one station of one girder such as at station A, while another previously tack welded partly fabricated girder is subjected to drilling and riveting operations from the gantry by stages at station B.

After the gantry has progressed down the length of the girder in this fashion, it becomes necessary to then return the gantry in the opposite direction, as indicated by the left-most arrow in FIGURE 4.

The gantry is then moved to the position shown in FIGURES 1 and 2. Assuming now that the girder which has been completed following the drilling and riveting operations, has been removed from station B, and that a new partially fabricated girder with its elements tack welded or in some cases clamped in place, is resting at station A on the supports 58, the gantry is advanced by stages to the left along the length of station A to perform, by means of the drills and riveters supported thereon, the final fabricating steps in the construction of the girder at station A. It will be noted that this method provides no limitation concerning the length, width or depth of the girder under construction, and the web plate 20 may be made up of a number of pieces of metal of any desired gauge. The gantry may perform operations in the construction of various sized girders, and can be adjusted to fabricate girders whose web plates are of different lengths and the cover plates of which are also of different lengths and heights.

The gantry uses a plurality of gang drills and riveters for performing its operations at various angles and positions of adjustment. Rivets 33 for one cover plate call for horizontal movements of the drills and riveters, while on the other cover plate the same operation must be performed by other drills and riveters, inasmuch as these cover plates are spaced from each other. The rivets 32 must be placed in holes which are drilled vertically. Means for adjusting all of the gang of drills and riveters must be provided in order to fabricate girders of different sizes, i.e. where the distance between the cover plates will vary, and because of the height of the cover plates themselves will vary in length, in accordance with requirements for girders of different proportions to suit various conditions of use.

It will be understood that each of the drilling and riveting units is preferably of the gang type, i.e. each contains a plurality of drilling units and riveting units so that a number of operations may be performed simultaneously. The means for supporting these various units in adjustable positions will now be described.

Extending to the left from the gantry as viewed in FIGURE 4, is a beam 62 which is pivotally connected at 64 to the gantry by a vertical pivot. Supported from said beam is a conventional C riveter 67. This riveter is for the purpose of riveting cover plates 22 to the flange angles. It is only necessary to move the gantry each time a distance of between three and four feet, which is approximately the center distance of the web stiffener angles 26.

Extending to the right of the gantry, as seen in FIGURE 1, is a spaced pair of I-beams 66. These I-beams are fixed to the gantry and move with the same. Referring to FIGURE 14 a rail 68 is provided with pairs of curved arms 70, with rollers 72 mounted on the upper extremity thereof. These rollers are adapted to permit adjustment in a longitudinal direction of the rail on the I-beams 66. The rail, therefore, is movable in a direction parallel to the girder for a distance corresponding to the length of the beams 66, say of about six feet. Adjustably mounted on the rail 68 so as to be adjusted transversely to the direction of adjustment along the beams 66 is a multiple drill support 73 for supporting the drills 74. These drills are used for simultaneously drilling a series of holes in a vertical direction for receiving the rivets 30 and 32, and it will be appreciated that all of the vertical drilling may be accomplished along the width of the girder by these drills, one or more gangs of which may be mounted on the rail 68. As soon as all of the holes have been drilled for the reception of the rivets 30 and 32, the rail 68 may be moved on rails 66 two or three feet, amounting to the distance between the stiffener members, and another set of holes are drilled in the next pair of stiffener members 26, with their corresponding flange angles 24, and through the web plate 20.

A rod 76 extends transversely of the gantry, which rod is surrounded by a sleeve 78 having a locking bolt 80 for adjustably maneuvering the sleeve along the length of the rod 76. Extending outwardly, and in the longitudinal direction of the girder, is an arm 82, the end of which has adjustably mounted thereon a cover plate drill 84, as shown in FIGURE 12. It will be understood that the structure shown in FIGURE 12 is duplicated on opposite sides of the gantry, in order to drill horizontal apertures through the spaced cover plates 22. The flange drill mechanism is shown in FIGURE 13 and resembles the structure shown in FIGURE 12, which supports the cover plate drill means. As shown in FIGURE 13, there is a squared rod 85 having a squared sleeve 86 surrounding the same. The sleeve is adjustable along the length of the rod and is held in position by the locking bolt 88. The sleeve supports the arm 90 and adjustably mounted on this arm is the gang drill 94. This drill is used principally for drilling holes through the flanges 24, stiffener angles 26 and web plate 20, for the reception of the rivets 32.

Referring now to FIGURES 8 and 13, which show the drills which may preferably be used for drilling holes for the rivets 32 that will connect the web plate, flange angles, and stiffener members to each other, 92 as heretofore stated shows the drill motor which may be of any conventional type. The drill motor is mounted by a flexible connection 96 to a yoke 98 having arms 100 with rollers 102 on the upper ends thereof. These rollers, arms, and the motor suspended therefrom may be retained in position by the screw lock 104, which may be tightened against the lower flange of the beam 90 for maintaining the parts in position while drilling, as seen in FIGURE 8.

The motor 92 is provided with supporting arms 106 that support the magnets 108. Upon energization, these magnets will firmly attach the entire riveting mechanism to the workpiece, such as the web plate 20, during the drilling operation. The rollers 102 when released by screw lock 104 permit the entire drilling unit to be moved longitudinally of the workpiece, namely the girder. For transverse adjustment, as heretofore explained, the beam 90 and the drilling unit supported thereby may be adjustably moved along the rod 85 and the sleeve 86 fixed in position by the screw bolt 88.

It will be understood that the magnetic clamping mechanism shown in FIGURES 8 and 13 may be utilized for any of the other drilling units described herein.

In the claims, the longitudinal axis of the gantry is intended to mean the axis of the gantry which is in line with the longitudinal axis of the web plate when the gantry is in operational position over the web plate as illustrated in FIGURES 1 and 2. The transverse axis of the gantry is, of course, transverse to the gantry longitudinal axis defined above.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A method of fabricating plate girders which comprises the steps of placing a web plate on a supporting means in a substantially horizontal plane, temporarily attaching a plurality of flange angles and stiffener angles to the upper surface of said web plate, raising said web plate from said supporting means and rotating the same substantially 180° on the longitudinal axis of said web plate, lowering the assembly to the supporting means, temporarily attaching a plurality of flange angles and stiffener angles to the upper surface of the inverted web plate, clamping a pair of cover plates to the web plate, stiffener angles and flange angles, and subsequently performing drilling and riveting operations through said web plate, stiffener angles, flange angles, and cover plates while in situ.

2. A method of fabricating plate girders which comprises the steps of placing a web plate on a supporting means in a substantially horizontal plane, temporarily attaching a plurality of flange angles and stiffener angles to the upper surface of said web plate, raising said web plate from said supporting means and rotating the same substantially 180° on the longitudinal axis of said web plate, lowering the assembly to the supporting means, temporarily attaching a plurality of flange angles and stiffener angles to the upper surface of the inverted web plate, clamping a pair of cover plates to the web plate, stiffener angles and flange angles, moing a gantry along the length of said girder, and maintaining said gantry in fixed position while performing drilling and riveting operations in directions which are longitudinal and transverse to the longitudinal axis of said girder.

3. A method of fabricating plate girders which comprises the steps of placing a web plate on a supporting means in a substantially horizontal plane, temporarily attaching a plurality of flange angles and stiffener angles to the upper surface of said web plate, raising said web plate from said supporting means and rotating the same substantially 180° on the longitudinal axis of said web plate, lowering the assembly to the supporting means, temporarily attaching a plurality of flange angles and stiffener angles to the upper surface of the inverted web plate, clamping a pair of cover plates to the web plate, stiffener angles and flange angles, moving a gantry along the length of the assembly, and maintaining said gantry in fixed position while performing drilling and riveting operations in a direction which is transverse to the longitudinal axis of said assembly.

4. A method of fabricating plate girders which comprises the steps of placing a web plate on a supporting means in a substantially horizontal plane, temporarily attaching a plurality of flange angles and stiffener angles to the upper surface of said web plate, raising said web plate from said supporting means and rotating the same substantially 180° on the longitudinal axis of said web plate, lowering the assembly to the supporting means, temporarily attaching a plurality of flange angles and stiffener angles to the upper surface of the inverted web plate, clamping a pair of cover plates to the web plate, stiffener angles and flange angles, moving a gantry along the length of said girder, and maintaining said gantry in fixed position while performing drilling and riveting operations in a direction which is lengthwise of the longitudinal axis of the girder.

5. A method of fabricating plate girders which comprises the steps of placing a web plate on a supporting means in a substantially horizontal plane, temporarily attaching a plurality of flange angles and stifferener angles to the upper surface of said web plate, raising said web plate from said supporting means and rotating the same substantially 180° on the longitudinal axis of said web plate, lowering the assembly to the supporting means, temporarily attaching a plurality of flange angles and stiffener angles to the upper surface of the inverted web plate, securing cover plates to said web plate, and subsequently drilling and riveting horizontally and vertically said flange angles to said web plate, stiffener angles and cover plates in situ.

6. The invention of claim 5 wherein the support means are a plurality of pivoted members which are successively removed and returned to supporting positions adjacent the working area of said web plate.

7. The invention of claim 5 wherein a mobile tool carrying gantry is advanced in stages along the length of said web plate for performing the horizontal and vertical drilling and riveting operations.

8. The invention of claim 7 wherein said vertical drilling and riveting operations are carried out from a point above said web plate.

9. The invention of claim 7 wherein the gantry successively removes and returns to supporting positions a series of pivoted supporting members as said gantry is advanced in stages.

References Cited in the file of this patent

UNITED STATES PATENTS

| | | |
|---|---|---|
| 734,082 | Wuhing | July 21, 1903 |
| 900,109 | Marsellis | Oct. 6, 1906 |
| 1,069,995 | Anderson | Aug. 12, 1913 |
| 1,256,073 | Stevenson | Feb. 12, 1918 |
| 1,702,370 | Trevellyan et al. | Feb. 19, 1929 |
| 1,946,214 | Kabigting | Feb. 6, 1934 |
| 2,216,403 | Oeckl et al. | Oct. 1, 1940 |
| 2,246,494 | Amidt | June 24, 1941 |

FOREIGN PATENTS

| | | |
|---|---|---|
| 2,934 | Great Britain | Jan. 30, 1913 |
| 128,347 | Great Britain | June 23, 1919 |